UNITED STATES PATENT OFFICE.

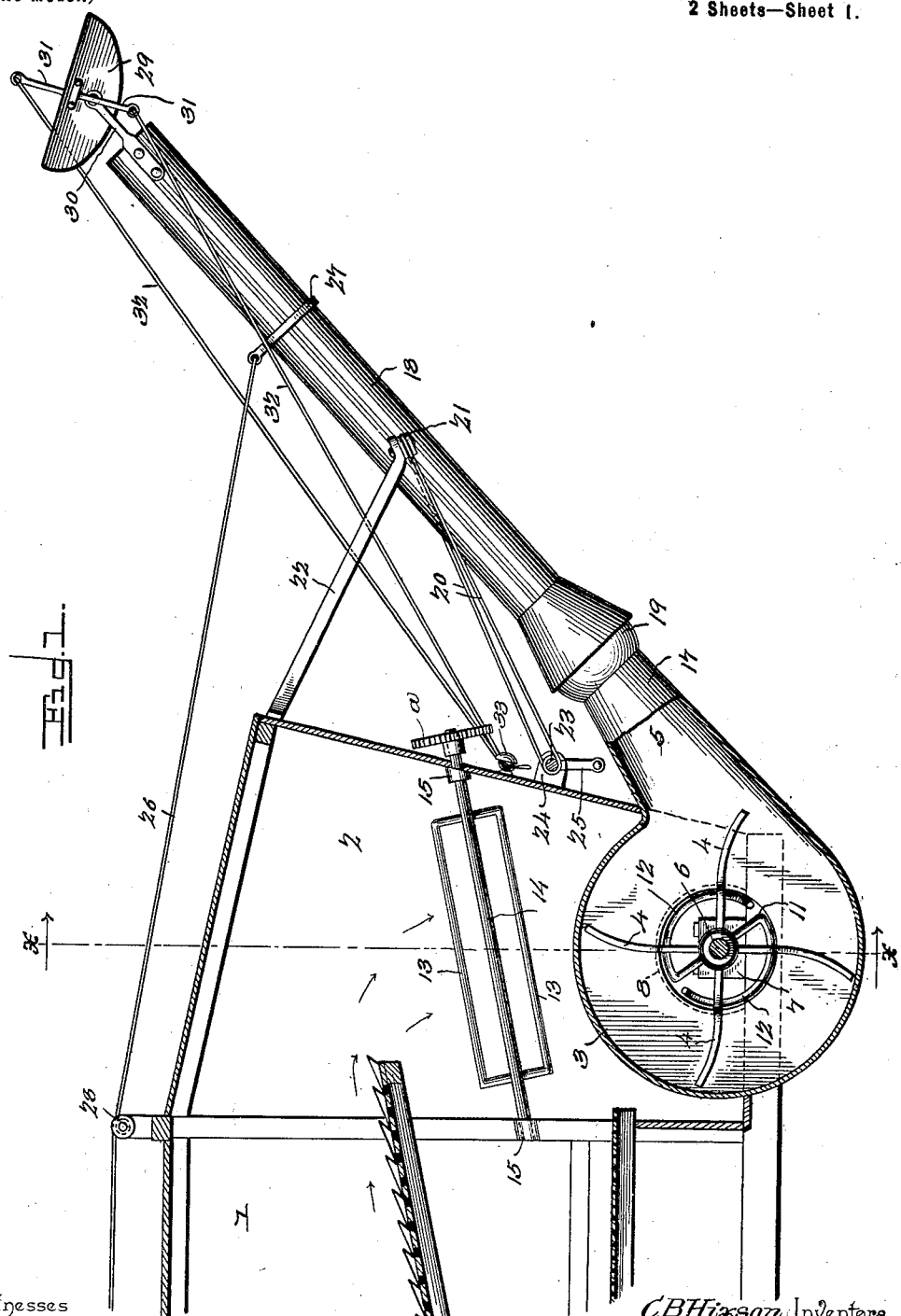

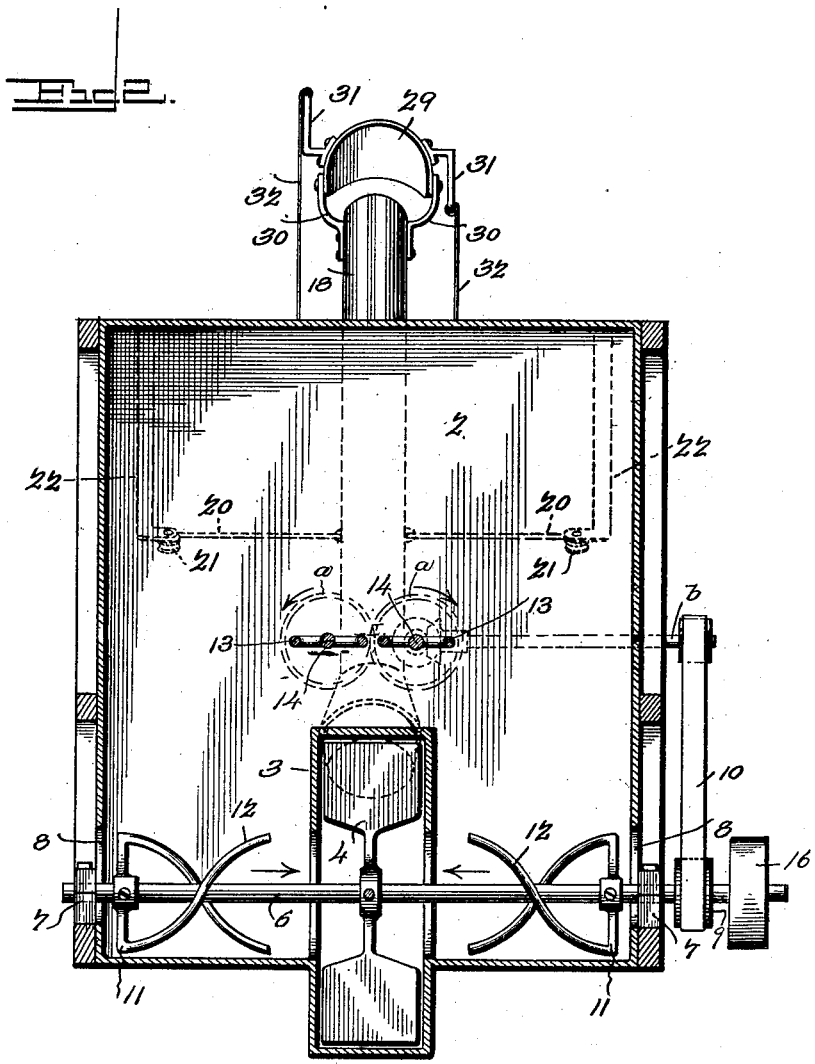

CLARENCE B. HIXSON, CHARLES T. HIXSON, AND ASA L. TARRANT, OF HOLT, OKLAHOMA TERRITORY.

PNEUMATIC STACKER.

SPECIFICATION forming part of Letters Patent No. 660,159, dated October 23, 1900.

Application filed February 2, 1900. Serial No. 3,696. (No model.)

*To all whom it may concern:*

Be it known that we, CLARENCE B. HIXSON, CHARLES T. HIXSON, and ASA L. TARRANT, citizens of the United States, residing at Holt, in the county of Woods and Territory of Oklahoma, have invented a new and useful Pneumatic Stacker, of which the following is a specification.

Our invention is a pneumatic stacker of the class in which a blast-fan and discharge-tube are combined in operation with a threshing-machine, the blast-fan creating a current of air through the discharge-tube which carries the straw with it through the tube and delivers the same upon a stack.

The object of our invention is to provide a pneumatic stacker which does not create a current or blast of air through the threshing and separating mechanism and which operates efficiently to deliver the straw upon the stack without wasting any of the grain.

Our invention consists in the combination, with a fan and feeders adapted to direct the straw mechanically to the fan, of beaters disposed above the feeders and adapted to loosen the straw as it passes from the separator and prevent it from falling in mass upon the feeders.

Our invention further consists in the peculiar construction and combination of devices hereinafter fully set forth, and particularly pointed out in the claims.

In the accompanying drawings, Figure 1 is a longitudinal sectional view of a portion of a threshing-machine and separator provided with a pneumatic stacker constructed in accordance with the essential features of our invention. Fig. 2 is a vertical transverse sectional view of the same, taken on the line $x$ $x$ of Fig. 1.

The threshing and separating machine 1, which may be of any preferred construction and forms no part of our present invention, is provided on its rear side with a casing 2, into which the straw is discharged from the separator. In the lower side of the casing is located a drum 3, of suitable construction, in which operates a fan 4, which is adapted to create a current or blast of air sufficiently strong to carry with it the straw which is delivered into the casing and to discharge the straw through the tube 5 onto a stack.

The fan is carried on a shaft 6, which is mounted in bearings 7, supported on rearward extensions of the threshing and separating machine frame. Openings, as at 8, in the sides of the casing 2 admit air to the fan. A pulley 16 on the shaft 6 receives power from a suitable counter-shaft through a belt (not shown) in the usual manner and causes the fan to rotate when the threshing and separating machine is in operation. Rigidly secured on the fan-shaft, on opposite sides of the fan, are feeders 11, which are provided with spiral arms 12, which spirally-disposed arms 12 in the respective feeders are disposed in reverse relation to each other and are hence adapted to feed straw from opposite sides of the drum toward the centrally-located fan mechanically, as will be readily understood.

A pair of skeleton beaters 13, which are preferably of oblong rectangular form, as here shown, are carried on shafts 14, which are arranged longitudinally in the casing 2 and mounted in suitable bearings, as at 15. The said beaters, as appears clearly in Fig. 2, are disposed above and at a suitable distance from the spiral straw-feeders and are adapted to separate the straw as it is discharged into the casing 2 and prevent it from falling in masses upon the feeders. The said beaters serve efficiently to break up damp or wet clumps or tufts of straw and to scatter the same loosely over the feeders in a condition to be caught and carried off by the fan blast or current.

For the purposes of illustration we have shown the shafts 14 connected together by intermeshing spur-gears $a$ and in Fig. 2 have indicated a driving-shaft $b$, geared to one of the shafts 14 and deriving its power through a belt 10 from a pulley 9 on the fan-shaft; but it will be understood that the said beaters may be rotated in any suitable manner and connected to the driving mechanism by any suitable form of gear, and hence we do not desire to limit ourselves in this particular.

The discharge-tube comprises the lower section 17, which is immovable and communicates with the drum and is adapted to receive the blast direct from the fan, and the upper section 18, which is connected to the lower section, as by a ball-and-socket joint, (indicated at 19,) this construction enabling the upper section to be inclined at any desired angle and disposed in any required direction. The upper section 18 of the discharge-tube is supported in part and adapted to be shifted laterally by cords 20, which are attached thereto, guided on sheaves 21 at the outer ends of supporting-arms 22 and have their inner ends attached to and coiled in opposite direction upon a winch 23. The said winch is journaled in bearings 24, that project from the rear side of the casing, and is further provided with a crank 25, whereby it may be turned in either direction. The arms 22, which carry the sheaves 21, project rearward from and are supported by the casing, as shown in Fig. 1. An elevator and supporting cord, rope, or chain 26 is connected to the upper section 18 of the discharge-tube, as by an eye-ring, (indicated at 27.) Said cord, rope, or chain passes over a suitable guide-sheave 28, mounted on the threshing and separating machine, and may be secured in any suitable manner, the function of this cord, rope, or chain, as will be understood, being to elevate or lower the upper section of the discharge-tube and to maintain the same at any required adjustment.

A deflector-shield 29 is disposed beyond the discharge end of the discharge-tube and pivotally mounted in the outer ends of a pair of arms 30, which project from said discharge-tube. The said deflector-shield is provided on opposite sides with respective upward and downward extending arms 31, to which are attached operating-cords 32, said cords being secured on a suitable cleat or other device, as at 33, and serving to dispose the deflector-shield at any required angle with relation to the discharge-tube.

When in operation, the beaters 13, as hereinbefore indicated, scatter the straw and break up the masses thereof and cause the straw to fall upon the spirally-disposed feeding-arms 12 in a condition to be caught and carried off by the blast or current from the fan. The function of the spirally-disposed straw-feeders 12 is to mechanically direct the straw as it falls upon said feeders from the said beaters toward the opposite sides of the fan, while the said straw will be caught by the intake of the fan and carried off by the air blast or current created by the fan through the discharge-tube. In pneumatic stackers which are not provided with such feeders the power of the blast-fans therein is necessarily great enough to cause the straw to be sucked into the sphere of action of the fans pneumatically, and the action of the fans has been such as to set up strong drafts and currents of air in the threshing and separating mechanism, which currents cause a certain proportion of the grain to be caught and carried thereby to the fans and to be discharged by the fans with the straw onto the stack and hence lost.

Our invention obviates waste of grain by providing the feeders, which serve mechanically to direct the straw to the fan, and hence reduce the necessary power thereof, a fan when combined with our improved devices for mechanically directing the straw thereto being efficient in discharging the straw upon the stack by a blast or current of air of greatly-reduced strength as compared with pneumatic straw-stackers which are not provided with such devices.

It will be furthermore understood from the foregoing description and by reference to the accompanying drawings that inasmuch as the openings 8, which supply air to the fan, are located in the sides of the drum and at right angles to the longitudinal axis of the threshing and separating machine the tendency of the fan to create drafts in the threshing and separating machine is materially reduced.

Having thus described our invention, we claim—

1. In a pneumatic straw-stacker, the combination with a stacker-tube and a fan, of feeders to mechanically direct the straw to the fan, and beaters disposed above said fan, and adapted to toss and loosen the straw before it falls upon the feeders, substantially as described.

2. In a pneumatic straw-stacker, the combination with a stacker-tube and a fan, of feeders to mechanically direct the straw to the fan, and the pair of open or skeleton oppositely-revoluble beaters disposed above the fan and adapted to toss and loosen the straw before it falls upon the feeders, substantially as described.

In testimony that we claim the foregoing as our own we have hereto affixed our signatures in the presence of two witnesses.

CLARENCE B. HIXSON.
CHARLES T. HIXSON.
ASA L. TARRANT.

Witnesses:
  H. L. MARTS,
  MAY MARTS.